3,248,408
PURIFICATION OF STEROID PHOSPHATES
James S. Grier, Danville, and Seemon H. Pines, Lewisburg, Pa., assignors to Merck & Co. Inc., Rahway, N.J., a corporation of New Jersey
No Drawing. Filed July 22, 1963, Ser. No. 296,497
14 Claims. (Cl. 260—397.45)

This invention relates to a process for the recovery of water-soluble steroids in pure form from reaction mixtures containing the same. More particularly, this invention relates to the purification of the phosphate tertiary lower alkyl amine salts of hydroxy steroids of the pregnane and androstane series, as for example, 21-phosphate tertiary lower alkyl amine salts of 21-hydroxy steroids of the pregnane series, 17-phosphate tertiary lower alkyl amine salts of 17β-hydroxy steroids of the androstane series, and the like.

This is a continuation-in-part of application Serial No. 216,977, filed August 15, 1962, and now abandoned, which is, in turn, a continuation of application Serial No. 97,471, filed March 22, 1961, and now abandoned.

The preferred 21-phosphate tertiary lower alkyl amine salts of 21-hydroxy steroids of the pregnane series which are to be recovered in accordance with the present invention are compounds having a general formula selected from the group consisting of

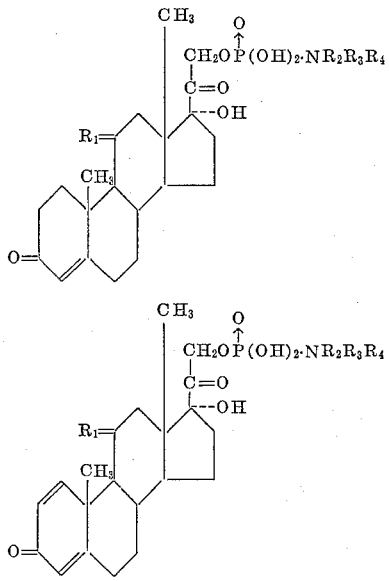

and the therapeutically active nuclear substituted derivatives thereof. In the above formulas $R_1$ is selected from the group consisting of β-hydroxyl

and keto, and $R_2$, $R_3$, and $R_4$ are lower alkyl radicals. "Therapeutically-active nuclear substituted derivatives" refers to compounds which conform to either of the above formulas except for the presence of one or more substituent groups not indicated in the formulas, and which have anti-inflammatory activity. Among the substituent groups which may be present are 2α-methyl, 9α-fluoro and 16α-methyl.

These steroid phosphate tertiary amine salts are water-soluble, stable crystalline compounds which are valuable because of their high degree of anti-inflammatory activity and low incidence of side effects. Thus these salts are superior to previously known products as anti-inflammatory active ingredients in opthalmic solutions and also in ointments for topical applications.

Among the therapeutically active 21-phosphate tertiary lower alkyl amine salts which can be recovered according to the present process are prednisolone 21-phosphate triethylamine salts, prednisolone 2-phosphate trimethylamine salt, prednisone 21-phosphate triethylamine salt, hydrocortisone 21-phosphate triethylamine salt, cortisone 21-phosphate triethylamine salt, 9α-fluoro-prednisolone 21-phosphate triethylamine salt, 9α-fluoro-16α-methylprednisolone 21-phosphate triethylamine salt, and other tri-lower alkyl amine salts, such as trimethylamine salts, triisopropylamine salts, tributylamine salts, and triisoamylamine salts, corresponding to the above triethylamine salts.

These steroid 21-phosphate tertiary amine salts may conveniently be prepared by reacting a 21-halo or 21-lower hydrocarbon sulfonate steroid corresponding to the desired end product with a tertiary lower alkyl amine and phosphoric acid or with the equivalent tertiary lower alkyl amine phosphate, in the presence of an alkaline organic solvent medium, preferably employing acetonitrile as the organic solvent. The mixture is then refluxed for from one to ten hours and the steroid phosphate amine salt is recovered from the reaction mixture by concentration of the organic solvent, whereupon the product is precipitated in crystalline form and separated from the mother liquor by, for example, filtration.

This crystalline product, it has been found, merely represents a first crop of the steroid tertiary amine salt, since there still remains in the mother liquor a substantial portion of this costly final product. Prior to the present invention, recovery of this unprecipitated portion of the final product from the mother liquor in pure form was impossible because of the presence of closely related steroid reaction products and other constituents of the reaction mixture which also remain in solution and interfere with known precipitants, selective extractions solvents, and the like.

These contaminants comprise principally (1) unreacted agents such as triethylamine phosphate, and (2) steroidal compounds such as tertiary amine salts of diesterified steroid phosphates, as for example, bis-prednisolone phosphate triethylamine salt, and various steroid pyrophosphates as for example, bis-prednisolone pyrophosphate triethylamine salt. The relatively high concentrations of these contaminants remaining in the mother liquor following removal of the first crop of crystals result in their co-precipitation or extraction along with the desired salt of the mono-ester when conventional recovery procedures are employed.

According to the present invention, it has now been found that recovery of the desired steroid monophosphate tertiary amine salts in pure form and in high yields from the aforesaid mother liquor can be accomplished by (1) replacing the reaction solvent of the mother liquor with a partially water-miscible organic solvent, preferably n-butanol, although secondary butanol, pentanol, and the like may also be employed, (2) separating any resulting inert solids from the n-butanol solution, chiefly tertiary amine phosphates which are insoluble in n-butanol, (3) extracting the filtrate with an aqueous alkali such as sodium hydroxide, sodium methoxide or the like until a strongly alkaline pH is obtained in the resulting aqueous layer whereby the desired steroid monophosphate is selectively extracted in the form of its di-sodium salt in said aqeuous layer while the aforementioned streoidal contaminants remain in the organic solvent, (4) acidifying the aqueous layer containing said steroid phosphate di-sodium salt with a strong mineral acid to a low pH thereby converting the steroid phosphate di-sodium salt to its free acid form, (5) replacing the aqueous solvent with a partially water-miscible organic solvent, preferably the same solvent which was employed in the first step of the process, by extracting the aqueous solution with said organic solvent, (6) alkalizing the resulting solution with a tertiary amine to form the corresponding mono tertiary amine salt of the steroid phosphate free acids, (7) replacing the partially water-miscible organic solvent with an organic solvent in which the steroid phosphate tertiary amine salt is essentially insoluble, such as, for example, acetonitrile, until crystallization takes place, and recovering the crystalline product.

Alternatively, it will be understood that instead of applying the present invention solely to the mother liquors this process may also be applied to the total reaction mixture resulting from the production of the tertiary amine salts and thus avoid the necessity for taking a first crop of crystals. It is preferable, however, to take a first crop of crystalline product to avoid the handling of large amounts of material in the present purification steps.

In one embodiment of this invention, the mother liquors comprising acetonitrile in which are dissolved a steroid phosphate tertiary amine salt such as prednisolone-21-phosphate triethylamine salt, and contaminants such as triethylamine phosphate, bis-prednisolone-21-phosphate triethylamine salt and bis-prednisolone-21-pyrophosphate triethylamine salt are first concentrated in vacuo to a thick concentrate which is thereafter flushed with n-butanol to form a slurry consisting mainly of precipitated triethylamine phosphate which is insoluble in n-butanol. This slurry is then diluted with additional n-butanol and the precipitate removed, for example, by filtration and washed by displacement and slurry. Although this step may be carried out at room temperature, it is desirable that the n-butanol solution be cooled to about 0°–5° C. and aged for one to four hours and preferably two hours prior to separation of the triethylamine phosphate to insure complete precipitation of this contaminant.

Although it is not necessary to do so, the resulting filtrate may then advantageously be washed with a strong acid such as sulfuric acid until a pH of less than about 1.0 and preferably less than 0.65 is achieved in the acidic water layer in order to remove any remaining triethylamine. When this is done it is then necessary in the succeeding alkalizing step to first remove the excess sulfuric acid by washing the n-butanol layer with water followed by treatment with a strong aqueous alkali such as sodium hydroxide until the pH of the resulting water layer is about 0.5 to 1.0 and preferably about 0.65. This water layer is then separated and discarded.

Irrespective of whether or not the filtrate is first treated with a strong acid followed by removal of the excess acid, water is then added to the n-butanol solution and the pH of the aqueous phase adjusted to a strongly alkaline pH with additional aqueous alkali, preferably sodium hydroxide, thereby forming the di-alkali-metal salt of the 21-phosphate steroid compound. The water layer containing the steroid phosphate salt is then separated from the alcoholic phase. This results in the substantially complete separation of the desired water-soluble steroid phosphate compound from the unwanted steroid contaminants which remain in the n-butanol layer.

In carrying out this step of the process the pH of the aqueous phase should be in the range of from about 9.0 to 14.0 and preferably from about 10 to 11. The pH should not be less than 9.0 in order to prevent extraction of the contaminants along with the di-sodium salt compounds.

The di-alkali-metal salt of the steroid phosphate as for example, the di-sodium salt, is then desirably converted to the corresponding triethylamine salt, in which form it may readily be recovered. This conversion is readily achieved by first treating the aqueous solution containing the di-sodium salt with a strong mineral acid such as sulfuric acid, until a pH of not greater than about 2 is reached. The 21-phosphate free acid which is thereby formed is then extracted from the aqueous phase into the alcoholic phase with n-butanol and the aqueous layer discarded. Treatment of the n-butanol solution with triethylamine until the solution is basic results in the formation of the corresponding 21-phosphate triethylamine salt. Precipitation and recovery of this salt product may then be conveniently achieved by replacing the n-butanol with a solvent in which the steroid phosphate salt is insoluble. Acetonitrile has been found to be particularly effective for this purpose, and the substitution of this solvent for the n-butanol can be readily effected by flushing the n-butanol with acetonitrile until crystallization occurs.

In this final crystallization step it is desirable to age the resulting slurry for from 12 to 24 hours at room temperature, followed by cooling to about 0° C. to aid in the crystallization of the trialkylamine salt, which may then be recovered by conventional means, as for example by filtration, or removal of the solvent, or the like.

The following examples illustrate methods of carrying out the present invention, but it is understood that these examples are given for purposes of illustration and not limitation.

*Example 1*

A solution of 102 cc. of triethylamine and 24 cc. of phosphoric acid in 144 cc. of acetonitrile is poured into a suspension of 48 g. of $11\beta,17\alpha$-dihydroxy-21-iodo-1,4-pregnadiene-3,20-dione and 6 g. of silver phosphate in 360 cc. of acetonitrile. The mixture is boiled at reflux for about one and one-half hours with a clear solution resulting after about 20 minutes. The solution is filtered hot to remove trace insolubles and the filtrate concentrated under reduced pressure at a bath temperature of 50° C. to a volume of 120 cc. The concentrate is aged for 16 hours at 25° C. and the resulting slurry is diluted with 120 cc. of acetonitrile, aged at 0° C. to 5° C. for one hour and filtered. The filter cake of $11\beta, 17\alpha,21$-trihydroxy-1,4-pregnadiene-3,20-dione 21-phosphate triethylamine salt (prednisolone 21-phosphate triethylamine salt) is washed with acetonitrile and ether and dried in air at 25° C.

*Example 2*

The mother liquor obtained from the process described above in Example 1 is concentrated in vacuo to 70 cc., maintaining the temperature below 45° C. The concentrate is then flushed with three 25 cc. portions of n-butanol. The resultant slurry is diluted to 120 cc. with n-butanol and cooled to 0° C. After aging at that temperature for two hours, the solids are collected on a funnel and washed with two 10 cc. portions of cold n-butanol by displacement, 20 cc. by slurry, and then 10 cc. by displacement. The solids are identified as being principally triethylamine phosphate. The filtrate is diluted to 300 cc. with n-butanol and then washed with one 50 cc. and five 25 cc. portions of 6 N sulfuric acid. 25 cc. of water is then added with stirring to the n-butanol layer followed by 50% sodium hydroxide until the pH of the water layer is 0.65. The solution is cooled to maintain the temperature at 25° C. The water layer is then separated and discarded.

Another 25 cc. of water is added to the n-butanol and the pH of the water layer adjusted to pH 10.0 with 50% sodium hydroxide. After separation of the basic water layer the n-butanol is washed with four 25 cc. portions of water, maintaining each of these water layers at a pH of 9.25. The combined water layers are adjusted to pH 2 with sufficient 25% sulfuric acid and then extracted with three 40 cc. portions of n-butanol. The water layer is then discarded.

The rich n-butanol extracts are concentrated in vacuo to 17 cc., maintaining the temperature below 45° C. Triethylamine (4 cc.) is added until the solution is basic. The solution is then flushed in vacuo with five 25 cc. portions of acetonitrile, during which time crystallization begins to occur. Another 1 cc. of triethylamine and 25 cc. of acetonitrile are added and the slurry reconcentrated to the absence of triethylamine. After diluting the slurry to 67 cc. with acetonitrile, the slurry is aged 18 hours at room temperature and then cooled to 0° C. and held at that temperature for 2 hours. Prednisolone phosphate triethylamine salt is collected on a funnel and washed by displacement with four 5 cc. portions of cooled acetonitrile followed by ethyl other and dried in vacuo at 50° C.

*Example 3*

A solution of 102 cc. of tributylamine and 24 cc. of phosphoric acid in 144 cc. of acetonitrile is poured into a suspension of 48 g. of 9α-fluoro-11β,17α-dihydroxy-16α-methyl-21-iodo-1,4-pregnadiene-3,20-dione and 6 g. of silver phosphate in 360 cc. of acetonitrile. The mixture is boiled at reflux for about one and one-half hours with a clear solution resulting after about 20 minutes. The solution is filtered hot to remove trace insolubles and the filtrate concentrated under reduced pressure at a bath temperature of 50° C. to a volume of 120 cc. The concentrate is aged for 16 hours at 25° C. and the resulting slurry is diluted with 120 cc. of acetonitrile, aged at 0° to 5° C. for one hour and filtered. The filter cake of 9α-fluoro-11β,17α,21 - trihydroxy-16α-methyl-1,4 - pregnadiene-3-20-dione 21-phosphate tributylamine salt is washed with acetonitrile and ether and dried in air at 25° C.

The mother liquor obtained from the process described above is concentrated in vacuo to 70 cc., maintaining the temperature below 45° C. The concentrate is then flushed with three 25 cc. portions of secondary butanol. The resultant slurry is diluted to 120 cc. with secondary butanol and cooled to 0° C. After aging at that temperature for two hours, the solids are collected on a funnel and washed with two 10 cc. portions of cold secondary butanol by displacement, 20 cc. by slurry, and then 10 cc. by displacement. The solids are identified as being principally tributylamine phosphate. The filtrate is diluted to 300 cc. with secondary butanol and then washed with one 50 cc. and five 25 cc. portions of 6 N sulfuric acid. 25 cc. of water is then added with stirring to the secondary butanol layer followed by 50% sodium hydroxide until the pH of the water layer is 0.65. The solution is cooled to maintain the temperature at 25° C. The water layer is then separated and then discarded. Another 25 cc. of water is added to the secondary butanol and the pH of the water layer adjusted to pH 10.0 with 50% sodium hydroxide. After separation of the basic water layer the secondary butanol is washed with four 25 cc. portions of water, maintaining each of these water layers at a pH of 9.25. The combined water layers are adjusted to pH 2 with sufficient 25% sulfuric acid and then extracted with three 40 cc. portions of secondary butanol. The water layer is then discarded.

The rich secondary butanol extracts are concentrated in vacuo to 17 cc., maintaining the temperature below 45° C. Tributylamine (4 cc.) is added until the solution is basic. The solution is then flushed in vacuo with five 25 cc. portions of acetonitrile, during which time crystallization begins to occur. Another 1 cc. of tributylamine and 25 cc. of acetonitrile are added and the slurry reconcentrated to the absence of tributylamine. After diluting the slurry to 67 cc. with acetonitrile, the slurry is aged 18 hours at room temperature and then cooled to 0° C. and held at that temperature for 2 hours. 9α-fluoro-11β,17α,21-trihydroxy-16α-methyl - 1,4 - pregnadiene-3,20-dione 21-phosphate tributylamine salt is collected on a funnel and washed by displacement with four 5 cc. portions of cooled acetonitrile followed by ethyl ether and dried in vacuo at 50° C.

*Example 4*

The processes of Examples 1 and 2 are carried out with 17α-hydroxy-21-iodo-1,4-pregnadiene-3,11,20-trione with the starting material. The product obtained is 17α,21-dihydroxy-1,4-pregnadiene-3,11,20-trione 21- phosphate triethylamine salt.

*Example 5*

The processes of Examples 1 and 2 are carried out with 9α-fluoro-11β,17α-dihydroxy-21-bromo-4-pregnene - 3,20-dione as the starting material and 9α-fluoro-11β,17α,21-trihydroxy-4-pregnene-3,20-dione 21-phosphate triethylamine salt is obtained.

Various changes and modifications may be made in the present invention, certain preferred embodiments of which are herein disclosed, without departing from the scope thereof; to the extent that these changes and modifications are within the scope of the appended claims, they are to be considered a part of this invention.

We claim:

1. The process which comprises partitioning a reaction mixture containing lower alkyl tertiary amine salts of a steroid phosphate between a dilute aqueous alkali solution at a pH of from about 9.0 to 14.0 and an organic solvent characterized as being partially water-miscible with, but forming a separate layer from, said dilute aqueous alkali solution, thereby forming an organic phase containing substantially all of the impurities in said reaction mixture, and an aqueous phase containing substantially pure alkali metal salts of said steroid phosphate.

2. The process which comprises partitioning a reaction mixture containing lower alkyl tertiary amine salts of a steroid 21-phosphate of the pregnane series between a dilute aqueous alkali solution at a pH of from about 9.0 to 14.0 and an organic solvent characterized as being partially water-miscible with, but forming a separate layer from, said dilute aqueous alkali solution, thereby forming an organic phase containing substantially all of the impurities in said reaction mixture, and an aqueous phase containing substantially pure alkali metal salts of said steroid 21-phosphate.

3. The process which comprises partitioning a reaction mixture containing lower alkyl tertiary amine salts of a steroid 17-phosphate of the androstane series between a dilute aqueous alkali solution at a pH of from about 9.0 to 14.0 and an organic solvent characterized as being partially water-miscible with, but forming a separate layer from, said dilute aqueous alkali solution, thereby forming an organic phase containing substantially all of the impurities in said reaction mixture, and an aqueous phase containing substantially pure alkali metal salts of said steroid 17-phosphate.

4. A process for the purification of 21-phosphate tertiary lower alkyl amine salts of 21-hydroxy steroids of the pregnane series from reaction mixtures containing the same which comprises partitioning the mixture between a water-miscible lower alkanol and dilute aqueous alkali at a pH of from about 9.0 to 14.0, whereby the impurities are in the organic phase and the desired steroid phosphate alkali metal salt is in the aqueous phase in substantially pure form.

5. The process according to claim 4 wherein the lower alkanol is n-butanol.

6. The process according to claim 2 wherein the dilute aqueous alkali employed is sodium hydroxide, and the resulting sodium salt of the steroid 21-phosphate is recovered from the aqueous phase.

7. A process for the recovery of 21-phosphate tertiary lower alkyl amine salts of 21-hydroxy steroids of the pregnane series from reaction mixtures containing the same which comprises (1) replacing the reaction solvent of the reaction mixture with a partially water-miscible lower alkanol, (2) separating any precipitated materials from the resulting solution, thereafter extracting said solution with an aqueous alkali to form an aqueous phase and an alcoholic phase, and adjusting the pH of said aqueous phase to a pH of from about 9.0 to 14.0, (3) separating the aqueous phase from the alcoholic phase and acidfying the aqueous phase with a strong acid, (4) replacing the acidified aqueous solvent with a partially water-miscible lower alkanol, (5) neutralizing the resulting solution with a tertiary lower alkyl amine, (6) replacing the solvent of the resulting solution with an organic solvent in which the steroid phosphate tertiary amine salt is essentially insoluble, and recovering the resulting crystals of the steroid phosphate tertiary lower alkyl amine salt.

8. A process for the recovery of steroid 21-phosphate tertiary lower alkyl amine salts of the pregnane series from reaction mixtures containing the same which comprises (1) replacing the reaction solvent of the reaction mixture with a partially water-miscible lower alkanol, (2) filtering the resulting solution to remove any precipitated inorganic reagents, (3) extracting the resulting filtrate with water and an aqueous solution of an alkali metal base until a pH in the range of from 9.0 to 14.0 is obtained in the resulting aqueous layer and separating said aqueous layer from the remaining alcoholic phase, (4) acidifying the aqueous solution with a strong mineral acid to a pH of less than 2.5, (5) extracting the acidified aqueous solvent with a partially water-miscible lower alkanol, (6) alkalizing the resulting solution with a tertiary lower alkyl amine, (7) flushing the alkaline solution with an organic solvent in which the steroid 21-phosphate tertiary lower alkyl amine salt is essentially insoluble and recovering the resulting crystals of said tertiary amine salt from said organic solvent.

9. A process for the recovery of steroid 21-phosphate tertiary lower alkyl amine salts of the pregnane series from reaction mixtures containing the same which comprises (1) replacing the reaction solvent of the reaction mixture with n-butanol, (2) filtering the alcholic solution to remove precipitated inorganic reagents, (3) extracting the resulting filtrate with aqueous sodium hydroxide to form an aqueous layer and an n-butanol layer and adjusting the pH of said aqueous layer with sodium hydroxide to a pH in the range of from about 10 to 11 and separating the aqueous layer from the n-butanol layer, (4) acidifying the aqueous layer with sulfuric acid to a pH of about 2.0, (5) extracting said acidified solution with n-butanol, (6) alkalizing the n-butanol solution with a tertiary lower alkyl amine, (7) flushing the alkaline solution with acetonitrile and separating the crystallized steroid 21-phosphate tertiary lower alkyl amine salt from the resulting solution.

10. A process for the recovery of prednisolone phosphate triethylamine salt from reaction mixtures containing as the principal contaminants triethylamine phosphate, bis-prednisolone phosphate triethylamine salt and bis-prednisolone pyrophosphate triethylamine salt, which comprises (1) concentrating said reaction mixture to a small volume, (2) diluting said concentrate with n-butanol, (3) filtering the n-butanol solution to remove precipitated triethylamine phosphate, (4) extracting the filtrate with aqueous sodium hydroxide until the pH of the resulting aqueous layer is about 10, (5) separating the aqueous alkaline layer containing prednisolone phosphate triethylamine salt from the n-butanol layer containing substantially all the bis-prednisolone phosphate triethylamine salt and bis-prednisolone pyrophosphate triethylamine salt, (6) acidifying the aqueous alkaline solution with sulfuric acid to produce a pH of about 2.0, (7) extracting said acidified solution with n-butanol, (8) alkalizing the resulting n-butanol solution with triethylamine, (9) flushing the alkaline alcoholic solution with acetonitrile, and recovering crystallized prednisolone phosphate, triethylamine salt from the resulting acetonitrile solution.

11. A process according to claim 8 wherein prior to the extraction of the n-butanol filtrate with aqueous sodium hydroxide said filtrate is first washed with a strong acid until a pH of less than about 1.0 is obtained in the resultant acidic water layer, followed by washing the n-butanol filtrate with a strong aqueous alkali until a pH of not greater than about 1.0 is obtained in said water layer.

12. In the process for the preparation of a steroid 21-phosphate tertiary lower alkyl amine salt of the pregnane series wherein the corresponding 21-halo steroid is reacted with a reagent selected from the group consisting of (1) a tertiary lower alkyl amine phosphate, and (2) a mixture of tertiary lower alkyl amine and phosphoric acid, in the presence of an alkaline, organic solvent medium followed by the recovery of a first crop of the corresponding crystalline steroid 21-phosphate tertiary lower alkyl amine salt and the resultant mother liquor, the improvement which comprises (1) replacing the reaction solvent of said mother liquor with a partially water-miscible lower alkanol, (2) separating any precipitated materials from the resulting solution and extracting the filtrate with an aqueous alkali to form an aqueous alkaline phase and an alcoholic phase (3) separating the aqueous phase from the alcoholic phase and acidifying the aqueous phase with a strong acid, (4) replacing the aqueous solvent with a partially water-miscible lower alkanol, (5) alkalizing the resulting with a tertiary lower alkyl amine, (6) replacing the solvent of the resulting solution with an organic solvent in which the steroid 21-phosphate tertiary amine salt is essentially insoluble, and recovering the resulting crystals of the steroid phosphate tertiary lower alkyl amine salt.

13. In the process for the preparation of prednisolone 21-phosphate triethylamine salt wherein the corresponding 21-iodo steroid compound is reacted with a reagent selected from the group consisting of (1) triethylamine phosphate, and (2) a mixture of triethylamine and phosphoric acid, in the presence of acetonitrile followed by the recovery of a first crop of crystalline prednisolone 21-phosphate triethylamine salt and the resultant mother liquor, the improvement which comprises (1) replacing the acetonitrile of said mother liquor with n-butanol, (2) filtering the n-butanol solution to remove the precipitated triethylamine phosphate, (3) extracting the filtrate with sodium hydroxide to form an aqueous phosphate and an organic phase, (4) adjusting the pH of said aqueous phase to a pH of about 10, (5) separating the aqueous alkaline phase from the n-butanol phase and acidifying the aqueous phase with sulfuric acid to produce a pH of about 2, (6) extracting said acidified solution with n-butanol, (7) alkalizing the resulting n-butanol solution with triethylamine, (8) replacing the n-butanol with acetonitrile and recovering crystallized prednisolone phosphate triethylamine salt from the resulting acetonitrile solution.

14. The process according to claim 9 wherein the starting material is the 21-iodo derivative of prednisolone, the tertiary amine is tributyl amine, and the partially water-miscible organic solvent is n-butanol.

References Cited by the Examiner
UNITED STATES PATENTS
3,087,927  4/1963  Brownfield et al. ___ 260—397.45

LEWIS GOTTS, *Primary Examiner.*